(12) United States Patent
Naitou (10) Patent No.: US 6,236,926 B1
(45) Date of Patent: May 22, 2001

(54) VEHICLE BEHAVIOR CONTROL DEVICE

(75) Inventor: Genpei Naitou, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/138,280

(22) Filed: Aug. 21, 1998

(30) Foreign Application Priority Data

Aug. 21, 1997 (JP) ..................................... 9-224539

(51) Int. Cl.$^7$ ....................................................... G06F 7/00
(52) U.S. Cl. ................ 701/70; 303/189; 701/72
(58) Field of Search ................... 701/70, 72, 71, 701/78, 79, 82, 83, 90, 91; 303/139, 140, 146, 147, 155, 163, 165, 174, 183, 189; 180/197

(56) References Cited

U.S. PATENT DOCUMENTS

| | | | |
|---|---|---|---|
| 5,862,503 | * 1/1999 | Eckert et al. | 701/78 |
| 6,002,979 | * 12/1999 | Ishizu | 701/70 |
| 6,015,192 | * 1/2000 | Fukumura | 303/140 |
| 6,070,952 | * 6/2000 | Tozu et al. | 303/146 |

FOREIGN PATENT DOCUMENTS 10-152208  6/1998 (JP) .

* cited by examiner

Primary Examiner—William A. Cuchlinski, Jr.
Assistant Examiner—Edward Pipala
(74) Attorney, Agent, or Firm—Foley & Lardner (57) ABSTRACT

An upper limit of a target braking force for performing behavior control, and an upper limit of its variation rate, are limited so as not to produce hunting due to interference with an anti-skid control. A microcomputer comprising a braking force controller, in a step 81, calculates a target slip ratio (S1*) before limiting from a target braking force (F0*) before limiting and a wheel braking rigidity coefficient (ks), and when it is determined in a step 82 that (S1*) is larger than a maximum controllable slip ratio (Smax), in a step 84, limits a target slip rate (S2*) after limiting to (Smax) and limits the upper limit of target braking force after limiting, calculated by multiplying (S2*) by (ks), to a maximum value at which slip control is possible. In a step 85, a differential (ΔS*) between (S2*) and a target slip ratio (S0*) on an immediately preceding occasion is taken as a target slip variation rate, and when it is determined in a step 86 that (ΔS*) is faster than a predetermined value (ΔS0), the slip ratio (S*) is determined, in steps 89, 90, according to the target slip variation direction determined in a step 87, so that the variation rate of the target slip ratio (S*) is equal to or less than (ΔS0). In this way, the upper limit of the variation rate of the target braking force calculated by multiplying (S*) and (ks), can be limited.

13 Claims, 10 Drawing Sheets

When moving forward

FIG.10B

When moving forward

FIG.10C

When turning

FIG.11A

When moving forward

FIG.11B

When turning

FIG.11C

VEHICLE BEHAVIOR CONTROL DEVICE

FIELD OF THE INVENTION

The present invention relates to a behavior control device of a vehicle wherein the braking force of each wheel is individually controlled so that the vehicle exhibits an appropriate behavior, and in particular, relates to a behavior control device for a vehicle provided with a vehicle slip controller (anti-skid controller).

BACKGROUND OF THE INVENTION

Various types of vehicle behavior controller are known in the art. One such controller, which individually controls the hydraulic pressure of a wheel cylinder (braking force) of each wheel to prevent spin or drift out, etc., while the vehicle is turning or steering, is disclosed in JPA 8-310366.

This controller detects a steering amount, wheel speed, yaw rate, and tire grip limit. First, a target yaw rate in the grip limit is determined from these parameters, and it is determined whether or not the vehicle is in an oversteer or understeer turning state wherein the grip limit of the tire is exceeded.

When the vehicle is in a turning state where the tire grip limit is exceeded, the hydraulic pressure of the wheel cylinder of each wheel is controlled so that an actual yaw rate approaches a target yaw rate. In this way, the vehicle is run within such limits that the unnatural behaviour which can occur during turning is prevented.

In another type of controller, such as a wheel anti-skid controller, the hydraulic pressure of the wheel cylinder (braking force) is controlled so that a wheel slip ratio does not exceed a predetermined value.

This usually estimates the vehicle speed (running speed) from the plural wheel speeds, and computes the slip ratio of the wheel by comparing the wheel speed and vehicle speed, and controls the hydraulic pressure of the wheel cylinder so that this slip ratio is an ideal slip ratio whereby the frictional coefficient of the wheel on the road is maximized.

However, in a vehicle where a vehicle behavior controller and a wheel slip controller are both installed, these functions may mutually conflict.

For instance, if a large braking force is applied by behaviour control to prevent vehicle spin, the wheels may lock. The wheel slip controller then functions to decrease braking force to release the wheel lock.

However, as the behavior of the vehicle is unstable, behavior control again applies a large braking force, and when the wheels lock again, braking force is again decreased by slip control.

These operations are performed repeatedly, giving rise to "hunting" and making the total control unstable.

SUMMARY OF THE INVENTION

It is therefore an object of this invention to prevent hunting due to the mutual interference of both types of control.

To achieve the above object, this vehicle control device comprises a vehicle behavior controller which individually controls the braking force of each wheel so that the behavior of the vehicle is a target state, and a wheel slip controller which controls the braking force of each wheel so that a wheel slip ratio is a target slip ratio.

In addition, the control device further comprises a braking force limit controller which limits either an upper limit of a braking force target value for achieving the target vehicle state or an upper limit of a braking force target value variation rate, or both, to within a range at which there is no interference between the vehicle behavior controller and wheel slip controller.

The details as well as other features and advantages of this invention are set forth in the remainder of the specification and are shown in the accompanying drawings.

BRIEF DESCRIPTION OF THE DRAWINGS

FIGS. 8A and 8B show is a pressure variation characteristic when a pressure increasing valve and pressure reducing valve in the braking system of FIG. 1 are open; wherein

DESCRIPTION OF THE PREFERRED EMBODIMENTS

This invention will now be described with reference to the drawings.

Figure 1:
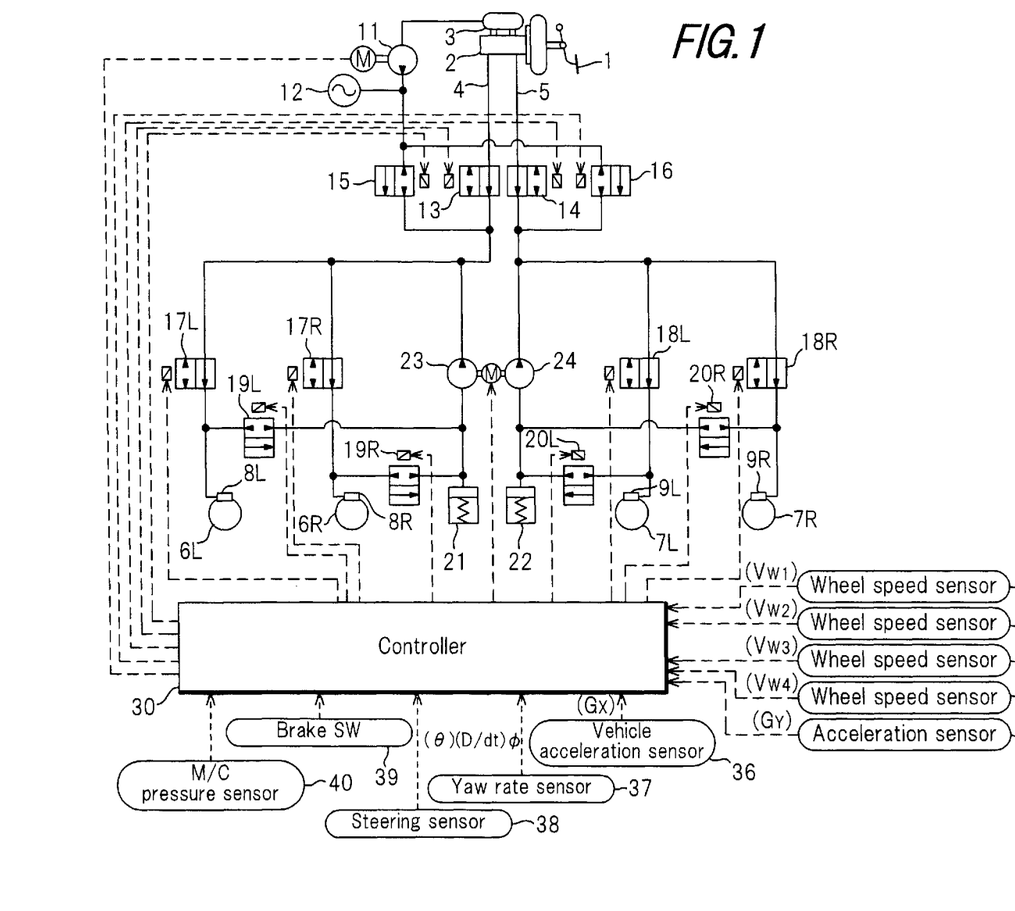
FIG. 1 is a system diagram showing the braking system of a vehicle behavior controller according to one embodiment of this invention.

FIG. 1 shows a braking system of a vehicle to which the vehicle behavior controller of this invention is applied. In the figure, 1 is a brake pedal, 2 is a master cylinder, and 3 is a brake fluid reservoir.

In this braking system, when the brake pedal 1 is depressed, hydraulic pressure supplied from the master cylinder 2 to circuits 4, 5, is led to wheel cylinders 8L/8R of left and right front wheels 6L/6R and wheel cylinders 9L/9R of left and right rear wheels 7L/7R so as to perform ordinary braking.

In this embodiment, the master cylinder 2 comprises a pump 11 which is a pressure source and an accumulator 12 which stores pump discharge pressure. The pump 11 is shared by the master cylinder 2 and a brake fluid reservoir 3.

Change-over valves 13, 14 which are normally open and change-over valves 15, 16 which are normally closed, are installed which select whether to lead the pressure of the master cylinder 2 or to lead the pressure stored in the accumulator 12 to the wheel cylinders 8L/8R of the left and right front wheels 6L/6R and wheel cylinders 9L/9R of the left and right rear wheels 7L/7R.

When the normally open change-over valves 13, 14 and the normally closed change-over valves 15, 16 are all switched off (not energized), the pressure of the master cylinder 2 is led to the wheel cylinders 8L/8R of the left and right front wheels 6L/6R and wheel cylinders 9L/9R of the left and right rear wheels 7L/7R.

Conversely, when the normally open change-over valves 13, 14 and the normally closed change-over valves 15, 16 are all switched on (energized), the pressure of the accumulator 12 is led to the wheel cylinders 8L/8R of the left and right front wheels 6L/6R and wheel cylinders 9L/9R of the left and right rear wheels 7L/7R.

Pressure increasing valves 17L/17R and 18L/18R which are normally open are respectively installed in brake pressure decrease circuits of the left and right front wheels 6L/6R and left and right rear wheels 7L/7R, and are connected to pressure decrease circuits in which pressure reducing valves 19L/19R, 20L/20R are also connected to a front wheel accumulator 21 and rear wheel accumulator 22.

When the pressure increasing valves 17L/17R and 18L/18R are switched off, and the pressure reducing valves 19L/19R and 20L/20R are also switched off, the hydraulic pressures of the wheel cylinders of the left and right front wheels 6L/6R and left and right rear wheels 7L/7R increase to the same pressure as the pressure of the pressure source.

When the pressure increasing valves 17L/17R and 18L/18R are switched on, and the pressure reducing valves 19L/19R and 20L/20R are switched off, the wheel cylinder pressures of the left and right front wheels 6L/6R and left and right rear wheels 7L/7R are maintained at their present values.

When the pressure increasing valves 17L/17R and 18L/18R are switched on and closed, and the pressure reducing valves 19L/19R and 20L/20R are switched on and opened, the wheel cylinder pressures of the left and right front wheels 6L/6R and left and right rear wheels 7L/7R are discharged to the corresponding accumulators 21, 22 and thereby reduced.

The internal pressures of the accumulators 21 and 22 saved at this time are returned to a front wheel brake fluid pressure circuit and rear wheel brake fluid pressure circuit by pumps 23 and 24 respectively connected to each of them.

Therefore, the hydraulic pressures of the wheel cylinders of the left and right front wheels 6L/6R and left and right rear wheels 7L/7R are each controlled by a different pressure valve, and the braking force also changes accordingly. The control of the wheel cylinder pressures will now be described.

In the ordinary state, all change-over valves 13, 14, 15, 16, and pressure increasing valves 17L/17R, 18L/18R, and pressure reducing valves 19L/19R, 20L/20R are switched off. When the brake pedal 1 is depressed, the master cylinder hydraulic pressure supplied from the master cylinder 2 to the circuits 4, 5, increases the hydraulic pressures of the wheel cylinders of the left and right front wheels 6L/6R and left and right rear wheels 7L/7R via the change-over valves 13, 14, and pressure increasing valves 17L/17R, 18L/18R, and these pressures brake the wheels according to the depression of the brake pedal 1.

Where the wheels lock during braking, when the pressure increasing valves 17L/17R, 18L/18R are switched on and closed, the wheel cylinder pressures of the corresponding wheels are maintained, when the pressure reducing valves 19L/19R, 20L/20R are switched on and opened, the hydraulic pressures of the wheel cylinders of the corresponding wheels fall. Anti-skid control which prevents locking of the wheels is performed by selecting these operations.

When wheel spin occurs while the vehicle is accelerating, the change-over valves 13, 14 are switched on and closed, and the change-over valves 15, 16 are switched off and opened, pressure is therefore led from the accumulator 12 so that the wheel cylinder pressures of the left and right front wheels 6L/6R and left and right rear wheels 7L/7R can increase.

In a vehicle where wheel spin does not occur, the pressure increasing valves 17L/17R, 18L/18R are switched on and closed, so wheel cylinder pressures are not generated for these wheels, but in a vehicle where wheel spin does occur, the wheel cylinder pressures of the wheels are increased by the pressure of the accumulator 12 by switching off the pressure increasing valves 17L/17R, 18L/18R. That is, traction control is performed which prevents wheel spin.

When the wheel cylinder pressure are excessive, the excess is discharged (reduced) by also switching on the pressure reducing valves 19L/19R, 20L/20R.

The aforesaid anti-skid control and the traction control are performed by a controller 30.

Apart from this, this controller 30 performs vehicle behavior control described hereafter.

For the purpose of this control, a signal from wheel speed sensors 31–34 which output a pulse signal corresponding to the speeds Vw1/Vw2 of the left and right front wheels 6L/6R and speeds Vw3/Vw4 of the left and right rear wheels 7L/7R, a signal from a horizontal acceleration sensor 35 which detects a horizontal acceleration GY of vehicle, a signal from a vehicle acceleration sensor 36 which detects a forward/backward acceleration GX of the vehicle, a signal from a yaw rate sensor 37 which detects a yaw rate $((d/dt)\phi)$ of the vehicle, a signal from a steering sensor 38 which detects a steering angle ($\theta$) of a steering wheel, a signal from a brake switch 39 which is switched on when the brake pedal is depressed, and a signal from a master cylinder pressure sensor 40 which detects the master cylinder pressure, are input to the controller 30.

The vehicle behavior control of the vehicle will be described referring to the flowcharts of FIG. 2–FIG. 4 and FIG. 7 performed by the controller 30.

Figure 2:
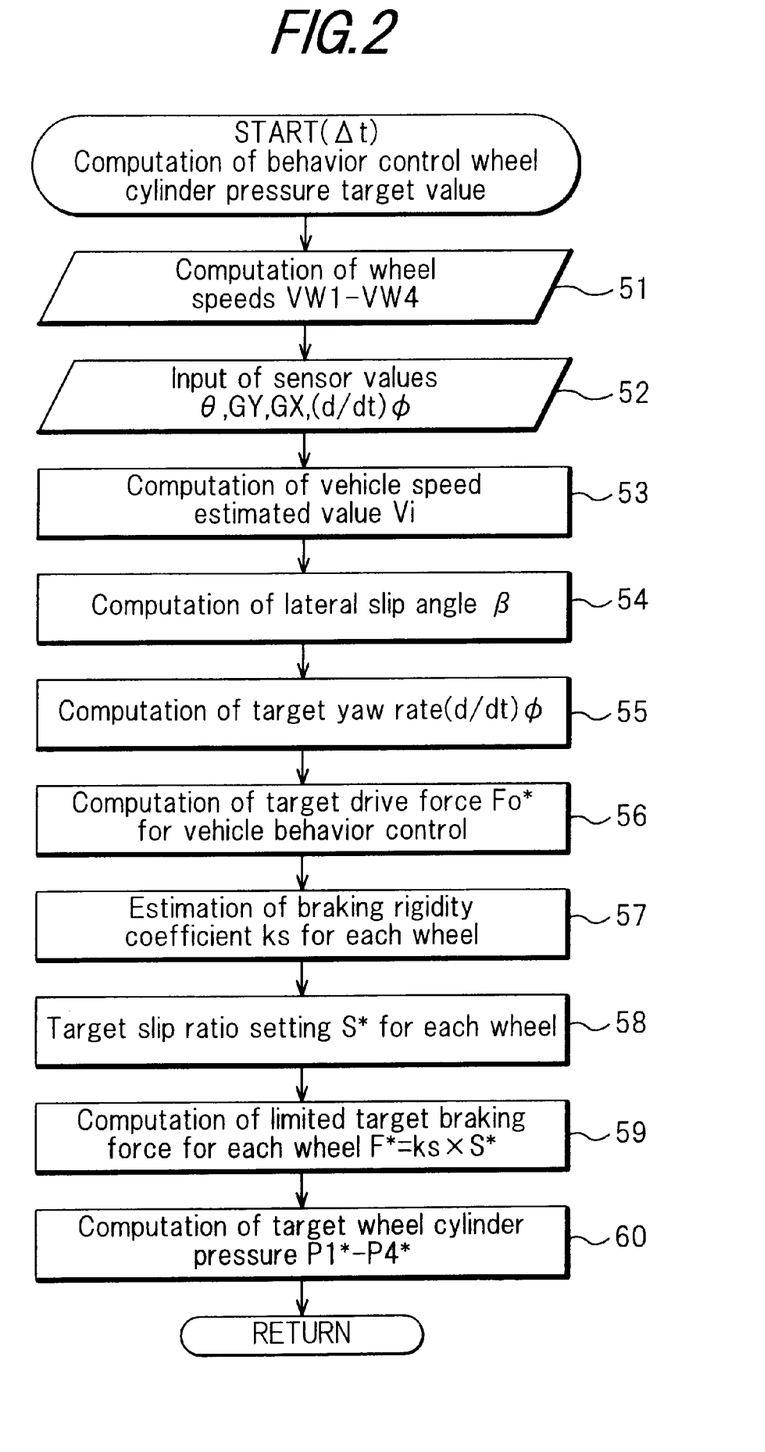
FIG. 2 is a flowchart showing a program for computing a wheel cylinder pressure target value for behavior control performed by the controller of this embodiment.
Figure 3:
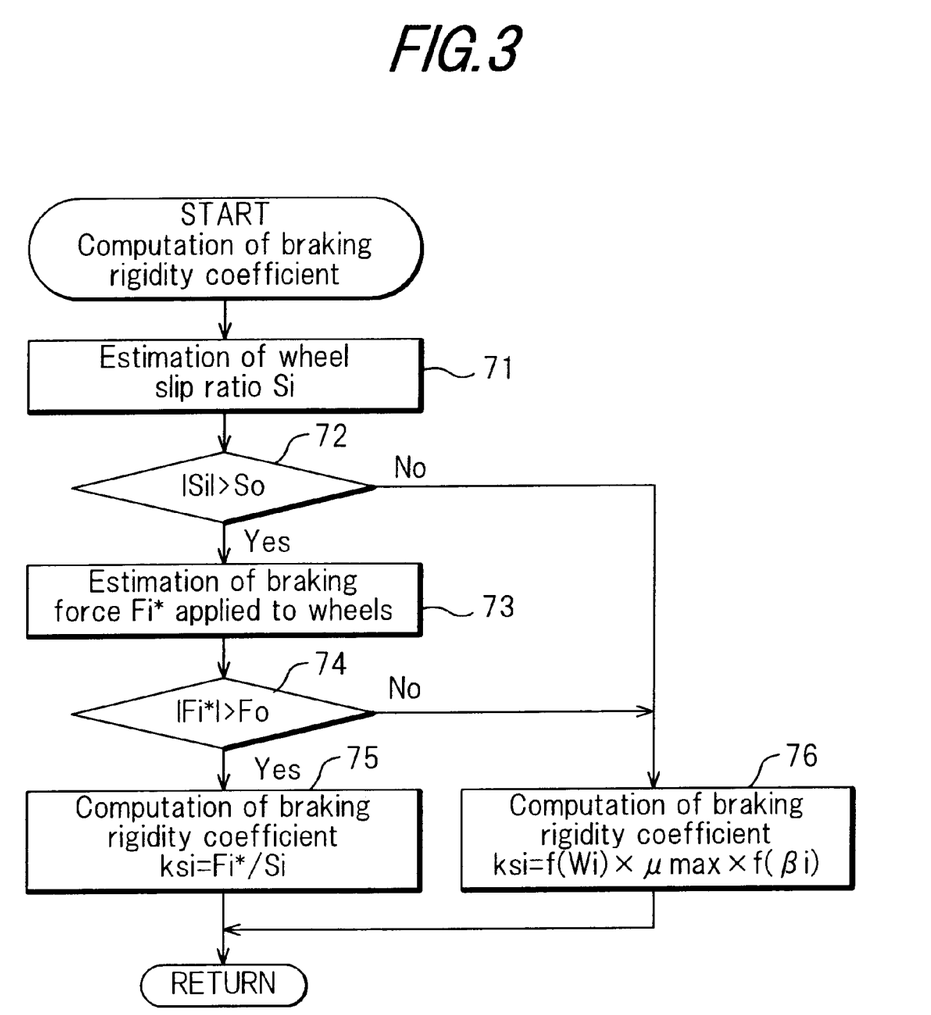
FIG. 3 is a program for computing a braking rigidity coefficient used in computing the wheel cylinder pressure target value for behavior control.
Figure 4:
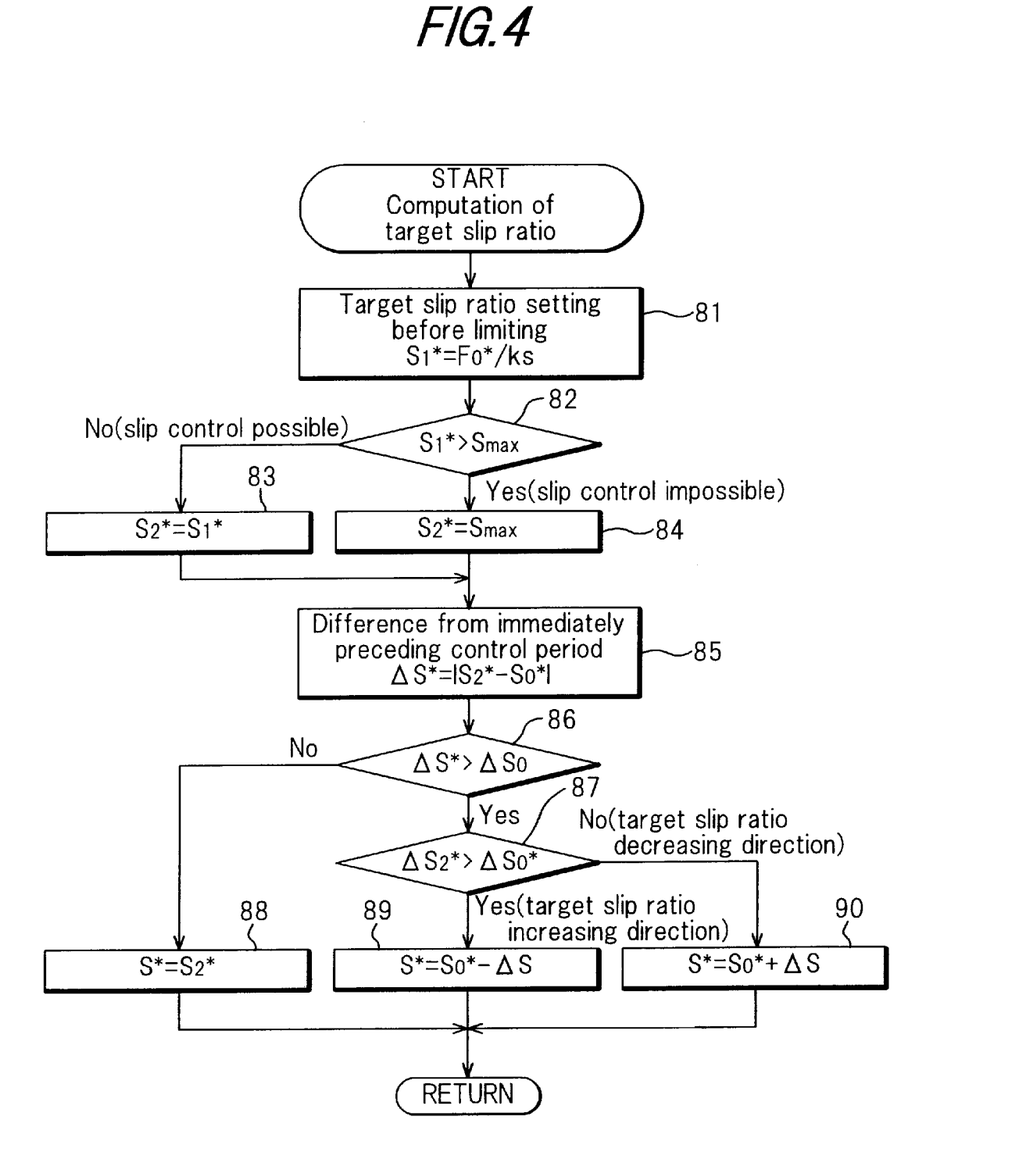
FIG. 4 is a flowchart showing a program for computing a target slip ratio used in computing the wheel cylinder pressure target value for behavior control.
Figure 7:
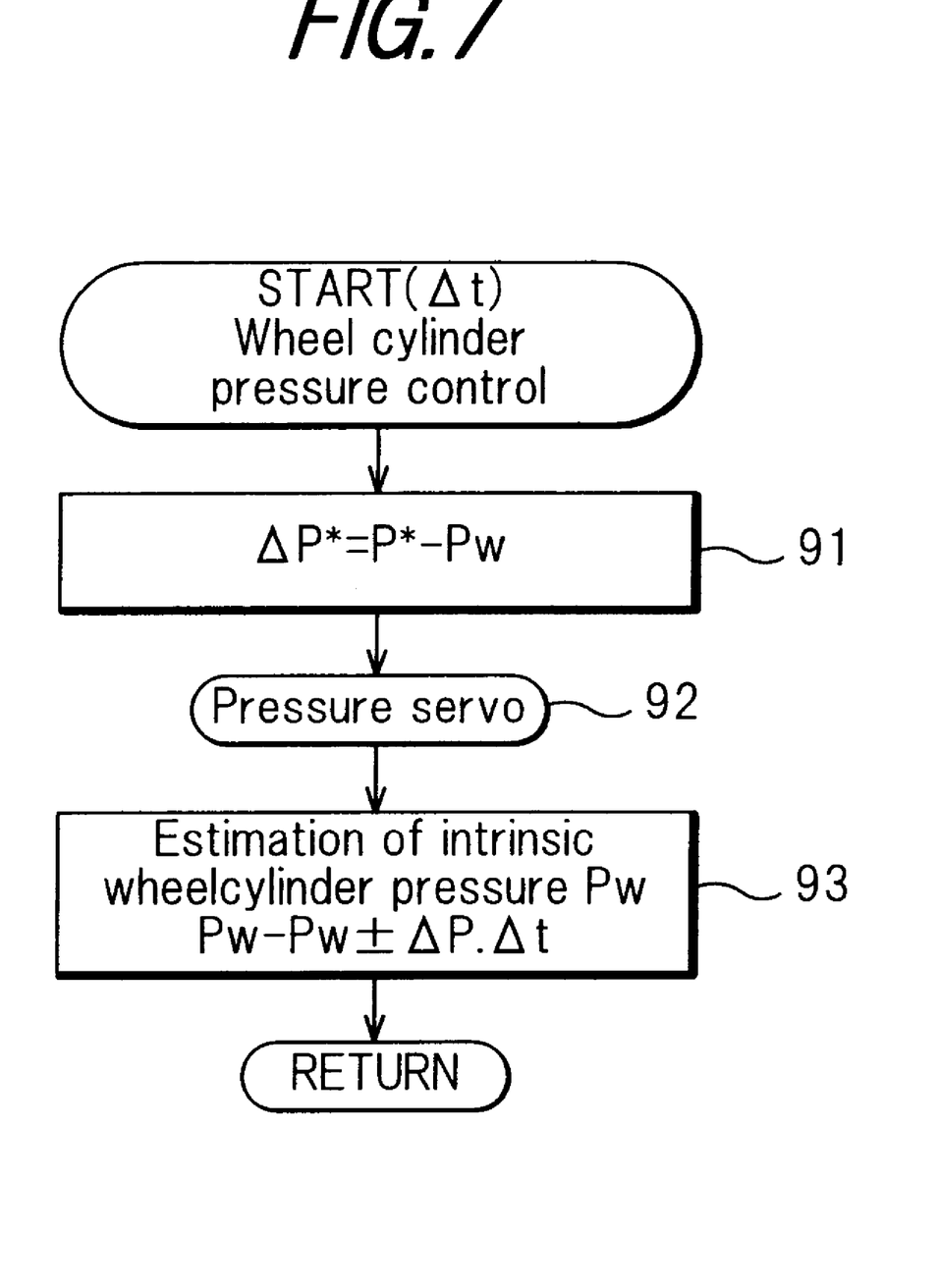
FIG. 7 is a flowchart showing a program for controlling a wheel cylinder pressure of each wheel performed by the controller.

These routines are performed at a fixed time ($\Delta t$) by a fixed interrupt. FIG. 2 shows a program for computing a wheel cylinder target value for behavior control, FIG. 3 shows a program for computing the braking rigidity coefficient, FIG. 4 shows a program for computing a target slip ratio, and FIG. 7 shows a program for controlling the wheel cylinder pressure of each wheel.

Before describing the control of FIGS. 2–4 and FIG. 7, the relation between the slip ratio of the wheels and the force which can be transmitted to the road surface, which affects the control, will first be described.

Figure 9:
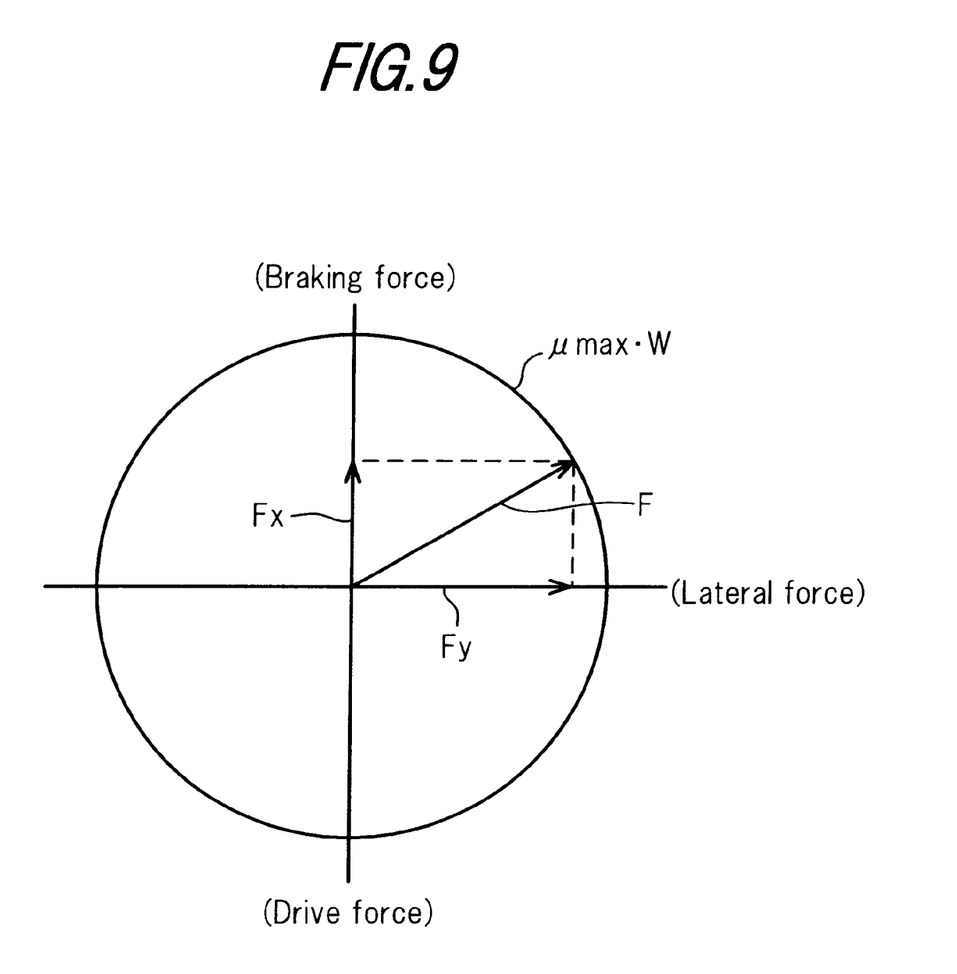
FIG. 9 is a descriptive drawing showing a friction circle of a tire.

Generally, the maximum value of the force that can be generated by a wheel tire may be represented schematically by the friction circle of FIG. 9.

A force (F) which is a combination of a braking force or drive force in the vehicle's forward/backward direction (forward/backward force) and a lateral force (FY) which occurs when the vehicle turns such as when it takes a corner, is equal to the size (radius) of the friction circle.

If the maximum frictional coefficient is ($\mu$max) and the wheel load is (W), $$F=(FX^2+FY^2)^{1/2}$$
$$=\mu max \cdot W$$

Therefore, the maximum value of the forward/backward force (FX) is equal to the friction circle (radius) only when the vehicle is moving straight forward, and when the lateral force (FY) is generated such as in turning, it is smaller than the friction circle.

Next, the relation between the forward/backward force (FX) and the wheel slip ratio (S) will be described. The frictional coefficient ($\mu$s) relative to the slip ratio (S) of the wheels when the vehicle is moving straight forward is different from the maximum frictional coefficient ($\mu$ max) depending on the road surface ($\mu$), but in general, it varies as shown in FIG. 10B.

In other words, the frictional coefficient is a maximum when the wheels are just beginning to slip.

Figure 10A:
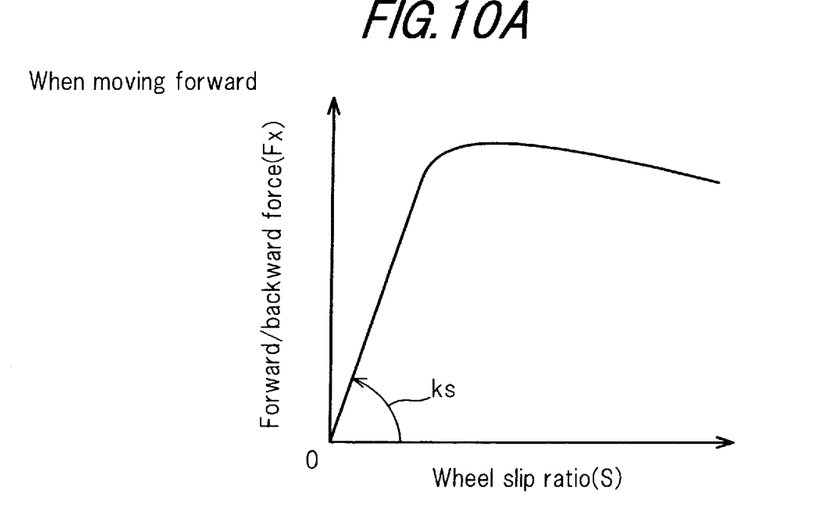
FIG. 10A is a graph showing a relation between a wheel slip ratio, wheel forward/backward force and braking rigidity coefficient when the vehicle is moving straight forward.
Figure 10B:
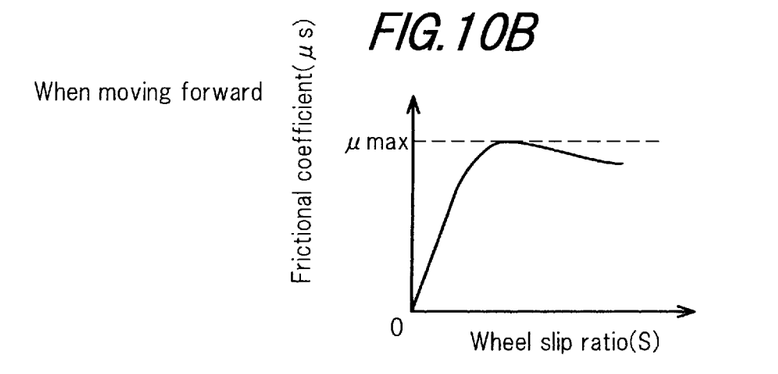
FIG. 10B is a graph showing a relation between a wheel slip ratio and frictional coefficient.

Therefore when the vehicle is moving straight forward, the forward/backward frictional force (FX) which has the same tendency as the aforesaid frictional coefficient, varies relative to the wheel slip ratio (S) as shown in FIG. 10A.

Figure 10C:
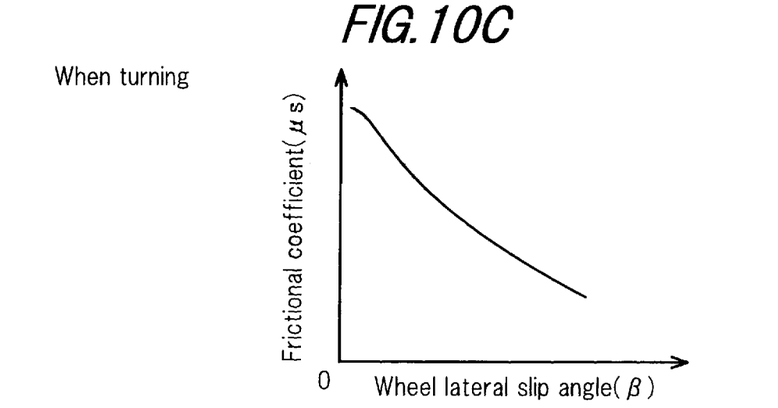
FIG. 10C is a graph showing a relation between a wheel sideslip angle and frictional coefficient when the vehicle is turning.

When the vehicle is turning, the wheels slip sideways, and the frictional coefficient ($\mu$s) relative to the sideslip at this time varies as shown in FIG. 10C.

In other words, the frictional coefficient ($\mu$s) becomes small as a sideways slip angle ($\beta$) increases.

Now, defining a braking (or drive) rigidity coefficient (ks) in terms of the forward/backward force (FX) and the slip ratio(S), we obtain:

$$ks=FX/S \qquad \ldots (1)$$

The rigidity coefficient (ks) may therefore be expressed as the slope of a characteristic line in FIG. 10(a).

Using this to express the relation between the aforesaid wheel load and frictional coefficient, $$FX=ks\times S=\mu s\times W\times S \qquad \ldots (2)$$

where ks=$\mu$s×W.

Therefore, considering the braking (drive) rigidity coefficient (ks), we obtain the following.

Figure 11A:
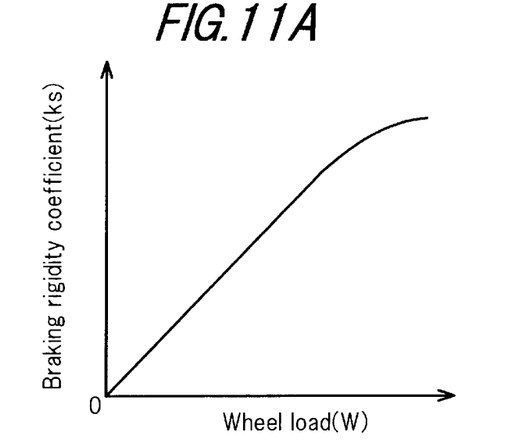
FIG. 11A is a graph showing the variation characteristic of a braking rigidity coefficient relative to wheel load.

(1) The braking rigidity coefficient increases almost proportionally to the wheel load (W) (however, the variation is nonlinear in the high load region as shown by FIG. 11A)

Figure 11B:
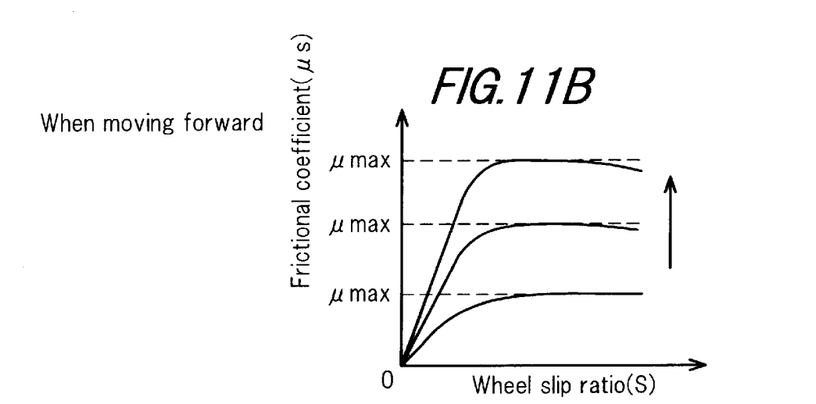
FIG. 11B is a graph showing a relation between the wheel slip ratio and frictional coefficient for roads of different ($\mu$) when the vehicle is moving straight forward.

(2) The braking rigidity coefficient increases almost proportionally to the frictional coefficient ($\mu$s). (however, the frictional coefficient ($\mu$s) varies relative to the wheel slip ratio (S) as shown in FIG. 11B when the vehicle is moving straight forward)

Figure 11C:
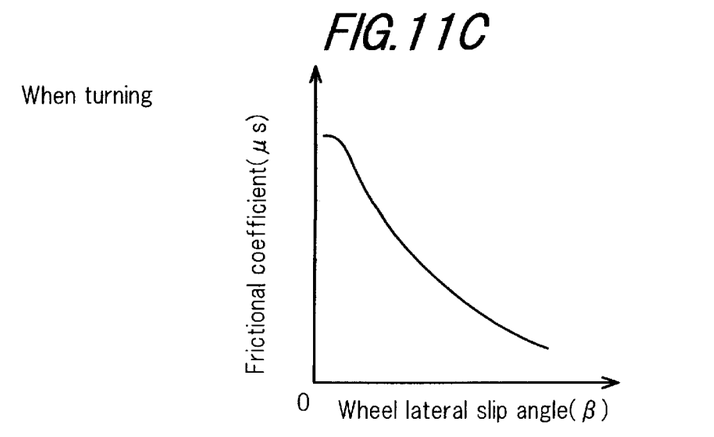
FIG. 11C is a graph showing a relation between a wheel sideslip angle and frictional coefficient when the vehicle is turning.

(3) The braking rigidity coefficient decreases in inverse proportion to the wheel sideways slip angle ($\beta$) when the vehicle turns (the frictional coefficient decreases in inverse proportion to the wheel sideways slip angle ($\beta$) as shown in FIG. 11C when the vehicle is turning).

Considering the forward/backward force (braking force) (FX) transmitting to the road surface, we obtain the following.

(1) The braking force is maximized not only when the value of the friction circle ($\mu$max·W) determined by the wheel load (W) and road surface ($\mu$) is a maximum, and the sideways slip angle ($\beta$) during turning must also be considered.

(2) The braking force (FX) transmitted to the road surface is determined to be $$FX=ks\times S \qquad \ldots (3)$$

due to the relation to the slip ratio (S).

However, the maximum frictional coefficient ($\mu$ max) relative to the slip ratio (S) differs according to the road surface ($\mu$) as shown in FIG. 11B.

Moreover, the road surface frictional coefficient ($\mu$s) due to the wheel sideways slip angle ($\beta$) varies as shown in FIG. 11C, and the braking force (FX) will also vary according to these frictional coefficients.

To accurately calculate the braking force, it is therefore necessary to search for the maximum value of road frictional coefficient ($\mu$s) in a time sequence in real time.

However in actual practice, considering the fact that the running state of the vehicle and the state of the road is continually changing, it is impossible to detect and to set the maximum value of braking force or the slip ratio at that time.

Next, we consider a variation speed of a target slip ratio. The running state of the tire can be expressed as follows:

$$It(d/dt)\omega=TB-FX\cdot ra$$
$$=ra(FB-FX) \qquad \ldots (4)$$

Therefore, TB=FB·ra.
where
It=wheel rotation inertia
$\omega$=wheel rotation speed
TB=braking torque due to brake
ra=wheel static load radius
FX=braking force transmitted from wheel to road
FB=wheel braking force As is clear from this equation, the rotational acceleration of the wheels increases with the difference between the wheel braking force (FB) applied by the brake and the braking force (FX) transmitted from the wheel to the road.

Therefore, to prevent the wheels locking and to prevent hunting during behavior control, it is expedient to gradually increase or decrease the braking force applied by the brake taking account of the braking force transmitted from the wheels to the road.

From the right-hand side of the rotational motion equation (4) above, a difference ($\Delta$F) between the braking force (FB) applied by the brake and the braking force (FX) transmitted from the wheel to the road given by the following expression due to the relation with slip ratio.

$$\Delta F=FB-FX$$
$$=ks(S^*-S) \qquad \ldots (5)$$

where
S=actual slip ratio of wheel and
S*=target slip ratio of wheel

Therefore the slip ratio may gradually be increased so that it is within tolerance limits.

In an actual control system, the target slip ratio (S*) varies when the braking force due to the brake increases or decreases, and:

$$S^* = SO^* + \Delta S^* \qquad \ldots (6)$$

where

SO*=target slip ratio in one control period, and

ΔS*=slip ratio variation amount.

For a certain time when the braking force due to the brake and the target slip ratio (S*) are not varying, feedback control to a target is performed as with a conventional anti-skid function.

However, in practice, the target slip ratio varies according to the braking force required by vehicle behavior control. This is a disturbing factor which causes hunting as described above.

Hence, in the aforesaid equation (6), slip ratio variation amount (ΔS*) is limited not to lead the wheel to rapid motion, and the braking force increase and decrease amount ΔF*=ks×ΔS* is determined based on this.

The anti-skid function therefore adapts stably to situations, and the aforementioned problem is eliminated.

The braking force increase and decrease amount (ΔF*) is proportional to the slip ratio variation amount (ΔS*), but it will of course vary depending on the rigidity coefficient (ks) based on the road surface (μ), wheel load (W) and wheel sideways slip angle (β), etc., so that it becomes an appropriate value.

The slip ratio $$S = (v - \Gamma\omega)/v$$
$$= 1 - \Gamma\omega/v$$

where v=wheel displacement speed.

Therefore, when only one wheel is braked due to a short term variation, the vehicle speed (≅wheel displacement speed) does not decrease and only the wheel locks.

In such a state, the following expression holds for the target slip ratio variation amount (ΔS*):

$$\Delta S^* \cong -(\Gamma-v)\Delta\omega$$

Therefore, the target slip ratio variation amount (ΔS*) may also be limited by the target rotation acceleration (Δω) (≅(d/dt)ω) of the wheel.

Based on the above considerations, to eliminate the problem of hunting of braking force in a vehicle controlled by behavior control and anti-skid control, this invention focuses on two key points. Firstly, the target braking force is set to a suitable value which is limited by the force that can actually be transmitted depending on the road surface and running conditions, based on the target braking force required to achieve vehicle behavior and target slip ratio calculated from the braking rigidity coefficient (ks). Secondly, the variation rate of the slip ratio which shows the slip state of the vehicle, is suitably limited so that, considering the motion of the vehicle, the tires do not slip suddenly. This invention implements these basic technical ideas in the manner described hereinbelow.

The control steps performed by this invention will now be enumerated in sequence.

Firstly, the computation of the wheel cylinder pressure target value for behavior control by the routine of FIG. 2, will be described.

In a step 51, the wheel speeds (VW1), (VW2) of the left and right front wheels 6L/6R, and the wheel speeds (VW3), (VW4) of the left and right rear wheels 7L/7R are respectively computed, and in a step 52, sensor output values showing other running conditions such the steering angle (θ), lateral acceleration (GY), forward/backward acceleration (GX) and yaw rate (d/dt), etc. are read.

In the next step 53, a vehicle speed estimated value (Vi) is produced.

In this case, according to this embodiment, the detected values of the aforesaid speeds (VW1), (VW2), (VW3), (VW4) are filtered.

During braking, the maximum value of these filter values is closest to the true vehicle speed, and when not braking, the minimum value of these filter values is closest to the true vehicle speed.

Therefore, the closest filter value to this true vehicle speed is selected, a pseudo-vehicle speed (Vi) is calculated based on this by a technique generally used with anti-skid controllers, and this is taken as the vehicle speed estimated value.

In calculating the vehicle speed estimated value (Vi), instead of the above, a correction may be made to an integral value found by integrating the vehicle forward/backward acceleration (GX), and this is taken as the vehicle speed estimated value (Vi).

Alternatively, this may be used in conjunction with the aforesaid method.

In a step 54, the wheel sideways slip angle (β) is computed as described hereinbelow.

First, a sideways slip acceleration (βdd) of the wheel is found from the lateral acceleration (GY), vehicle speed estimated value (Vi) and yaw rate ((d/dt)φ) by the equation:

$$\beta dd = GY - Vi \cdot (d/dt)\phi$$

A sideways slip speed (βd) is calculated by integrating this sideways slip acceleration (βdd).

The sideways slip angle (β) (=βd/Vi) is computed by dividing this sideways slip speed (βd) by the vehicle speed estimated value (Vi).

In a step 55, the target yaw rate (d/dt)φ* is calculated from the steering angle (θ) and vehicle speed estimated value (Vi).

This target yaw rate (d/dt)φ* is taken to be the yaw rate at which the expected cornering force is generated in the wheel and neutral steering is achieved.

In this case, the target yaw rate (d/dt)φ* is specified by the steering angle (θ) and vehicle speed estimated value (Vi). It is therefore preset as a map of steering angle (θ) and vehicle speed estimated value (Vi), and the target yaw rate (d/dt)φ* is calculated by looking up this map.

In a step 56, to control the yaw rate as a function of vehicle behavior, a vehicle behavior control amount is computed based on a deviation (or variation amount) between the aforesaid target yaw rate (d/dt)θ* and real yaw rate (d/dt)θ, and the aforesaid lateral slip angle (β) (or lateral slip angular velocity betad).

For example, a control gain corresponding to the running state is added to this, and a target braking force (ΔFO*) of the wheels to achieve the aforesaid vehicle behavior is calculated. In a step 57, the braking (drive) rigidity coefficient (ks) of each wheel is estimated.

This estimation will be described referring to the flowchart of FIG. 3.

First, in a step 71 of FIG. 3, a real slip ratio (Si) of the wheel is calculated by:

$$Si = (v - \Gamma\omega)v$$

or $$Si=(v-r\omega)/r\omega$$

where r$\omega$=wheel speed v=wheel displacement speed (found by assuming the vehicle speed estimated value (Vi) to be that of the vehicle's center of gravity, and adjusting this for the position of each wheel using the yaw rate (d/dt)$\phi$ and lateral speed.

In a step 72, it is determined whether or not the absolute value of the real slip ratio (Si) is larger than a slip ratio set value (SO).

When |Si|>SO, in a step 73, a drive force (Fi*) given to the wheels is estimated from an engine drive force (Fa) and the braking force (FB) by computing Fi*=Fa−FB.

Herein, the engine drive force (Fa) can be estimated from the throttle opening, engine rotation speed and gear ratio.

The braking force (FB) due to the brake can be calculated by multiplying the wheel cylinder pressure by a constant (determined by a pad frictional coefficient and effective radius).

In a step 74, it is determined whether or not the absolute value of the wheel drive force (Fi*) is larger than a wheel drive force set value (FO), and when |Fi*|>FO, in a step 75, the rigidity coefficient (kSi) of each wheel is calculated by $$kSi=Fi*/Si.$$

The equation for computing the braking force rigidity coefficient (kSi) is used only when it is determined in the step 72 that the real slip ratio (Si) is large (indicates a large vehicle slip state), and when it is determined in the step 74 that the wheel braking force (Fi*) is large. This is in order to prevent estimation errors in the braking rigidity coefficient (kSi).

When it is determined in the step 72 that the real slip ratio (Si) is large, the aforesaid equation for computing the braking rigidity coefficient (kSi) may be used immediately.

When it is determined in the step 72 that the real slip ratio (Si) does not exceed the slip ratio set value (SO), or when it is determined in the step 74 that the wheel drive force (Fi*) does not exceed the wheel drive force set value (FO), the routine proceeds to a step 76.

In the step 76, the braking rigidity coefficient (kSi) is calculated from a wheel load (Wi), wheel sideways slip angle ($\beta$i), and road frictional coefficient estimated value ($\mu$max), by the equation:

$$kSi=f(Wik, \beta i, \mu\ max)$$

$$f(Wi)\times\mu\ max\times f(\beta i)$$

Figure 5:
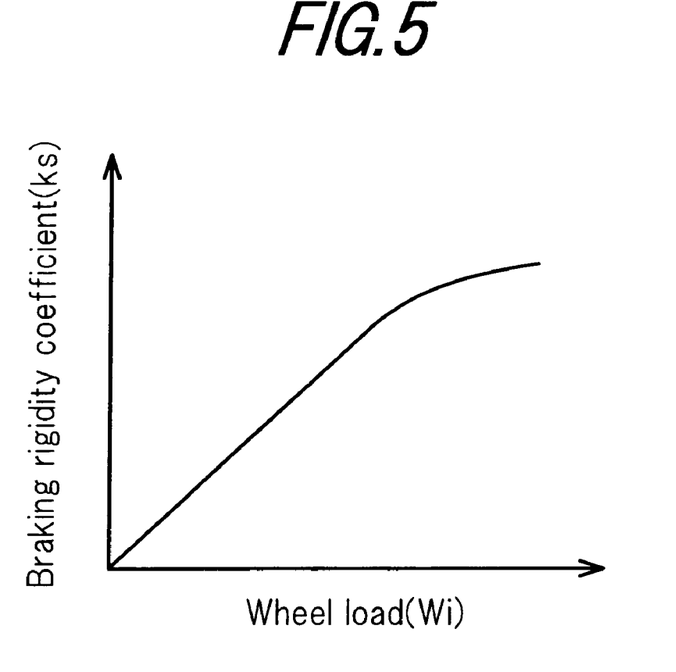
FIG. 5 is a graph showing a variation characteristic of the braking rigidity coefficient relative to the wheel load. relative to a wheel sideslip angle.

The aforesaid f(Wi) represents the variation characteristic of the braking rigidity coefficient (ks) due to the wheel load (Wi) on in a dry road as shown by FIG. 5.

Figure 6:
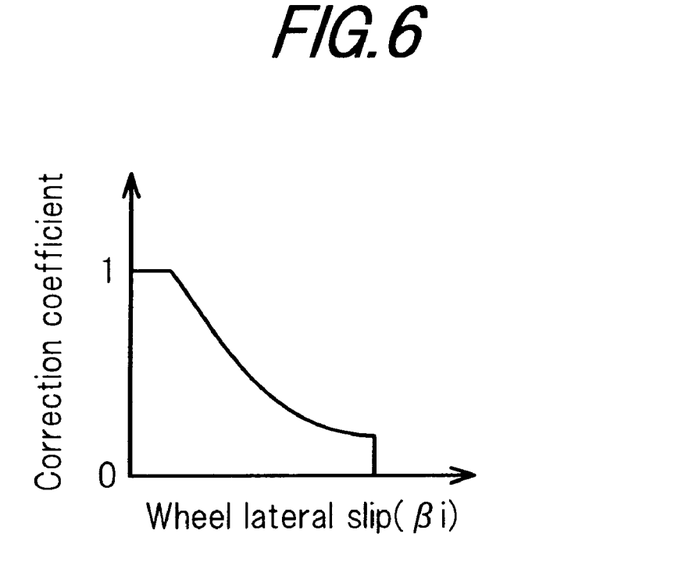
FIG. 6 is a graph showing the relationship between correction coefficient and wheel lateral slip parameters.

Moreover, f($\beta$i) shows the variation characteristic of a correction factor determined for each wheel sideways slip angle ($\beta$i) shown by FIG. 6.

Herein, the wheel load (Wi) may be estimated as a dynamic load taking account of the vehicle forward/backward acceleration and vehicle lateral acceleration relative to a static design load.

The wheel sideways slip angle ($\beta$i) can be calculated from the position of each wheel and steering angle assuming that a vehicle slip angle estimated value is located at the vehicle's center of gravity.

After the braking rigidity coefficient (ks) of each wheel is calculated as described hereinabove in a step 57 of FIG. 2, the target slip ratio (S*) of each wheel is set in a step 58 of the same figure.

The setting of this target slip ratio is described in detail in FIG. 4.

First of all, in a step 81, the target slip ratio S1*=FO*/ks before applying a limit, is computed by dividing the target braking force (FO*) before limiting found in the step 56 of FIG. 2 by the aforesaid braking rigidity coefficient (ks).

Next, in a step 82, it is determined whether or not the target slip ratio (S1*) before limiting is greater than a set value (Smax) corresponding to the maximum slip ratio (e.g., about 25%) which can be controlled.

In this way, it is determined whether the slip region is a region which cannot be controlled where hunting is liable to occur, or a slip region which can be controlled where this kind of problem will not occur.

If the slip is small so that slipping can be controlled, in a step 83, a target slip ratio (S2*) after limiting is set equal to the target slip ratio (S1*) before limiting.

However, if the slip is large so that slipping cannot be controlled, in a step 84, the target slip ratio (S2*) after limiting is limited to the limiting value (Smax) at which slip control is possible.

By setting the target slip ratio (S2*) after limiting in this way, the target slip ratio is limited to a range within which slip can be controlled, and the target braking force (F*) calculated as described hereafter can be limited to within an appropriate range.

Next, the variation rate of the target slip ratio is limited in steps 85–89.

Specifically, in the step 85, the absolute value of a difference between the target slip ratio (S2*) after limiting and a target slip ratio (SO*) in the immediately preceding control period, i.e. $\Delta S*=|S2*-SO*|$, is first calculated as a target slip variation amount.

Next, in the step 86, by determining whether or not the target slip ratio variation rate $\Delta S*$ is faster than a target slip ratio variation rate set value $\Delta SO$, it is determined whether or not the target slip ratio variation rate is within a range where hunting is likely to occur.

Also, in the step 87, by comparing the target slip ratio (S*) after limiting with the target slip ratio (SO*) in the immediately preceding control period, it is determined whether the target slip ratio is increasing or decreasing.

When, in the step 86, it is determined that the target slip ratio variation rate is within a range at which hunting is not likely to occur, i.e. $\Delta S \leq \Delta SO$, the routine proceeds to a step 88.

In the step 88, the target slip ratio (S*) is set to the same value as the target slip ratio (S2*) found as described above.

When, in the step 86, it is determined that the target slip ratio variation rate is within a range at which hunting is likely to occur, i.e. $\Delta S* > \Delta SO$, the routine proceeds to a step 87.

If the slip ratio is increasing according to whether the determined target slip ratio is increasing or decreasing, the routine proceeds to a step 89, and a value obtained by subtracting the predetermined amount ($\Delta S$) from the target slip ratio (SO*) is taken as the target slip ratio (S*).

When on the other hand the slip ratio is decreasing, in a step 90, a value obtained by increasing the target slip ratio(SO*) by the predetermined amount ($\Delta S$) is taken as the target slip ratio (S*).

In this way, it is arranged that the variation rate of the target slip ratio (S*) does not exceed the aforesaid predetermined value ($\Delta SO$).

By limiting the variation rate of the slip ratio (S*) so that it does not exceed the set value ($\Delta SO$), the variation rate of the target braking force (F*) calculated as described hereafter based on the target slip ratio (S*) can be limited to a proper range.

After setting the target slip ratio (S*) of each wheel as described above in the step 58 of FIG. 2, in a step 59, the target braking force (F*) of each wheel is found from this target slip ratio (S*) and the braking rigidity coefficient (ks) by computing F*=ks×S*.

However, as upper limits are set for the target slip ratio (S*) and its variation rate as already described hereabove, and these quantities are bounded so that they do not exceed these limits, a corresponding limit is also applied to the target braking force (F*).

In a following step 60, the wheel cylinder pressures (P1*), (P2*) of the left and right front wheels 6L, 6R and the wheel cylinder pressures (P3*), (P4*) of the left and right rear wheels 7L, 7R required to generate the target braking force for each wheel, are computed.

If these target wheel cylinder pressures are written as (P*), they may be found from P*=A×F*, where A is a constant determined by the dimensions of the brake unit of each wheel.

FIG. 7 is a program for controlling the pressure of each wheel based on the target wheel values (P1*), (P2*), (P3*) and (P4*) calculated as described above.

The values 13–16, 17L/17R, 18L/18R, 19L/19R, 20L/20R in FIG. 1 are switch-on, off controlled and duty controlled so that an intrinsic wheel cylinder pressure (PW) equals the corresponding target value (P*) computed from the above. Specifically, in a step 91, a pressure differential (ΔP*)=P*−PW between the intrinsic wheel cylinder pressure value (P*) and the present wheel cylinder pressure (PW) is calculated.

In the next step 92, the corresponding pressure increase valves 17L/17R, 18L/18R or pressure decrease valves 19L/19R, 20L/20R are duty controlled by a pressure servo so that this pressure differential (ΔP*) decreases.

The pressure increase valves or pressure decrease valves which are not duty controlled are maintained in an switch-on or off state so as to coincide with the aforesaid wheel cylinder pressure control.

Herein, the duty control determines the proportion of time for which the pressure increase valve or pressure decrease valve is open during one period (e.g. 50 msec).

Figure 8A:
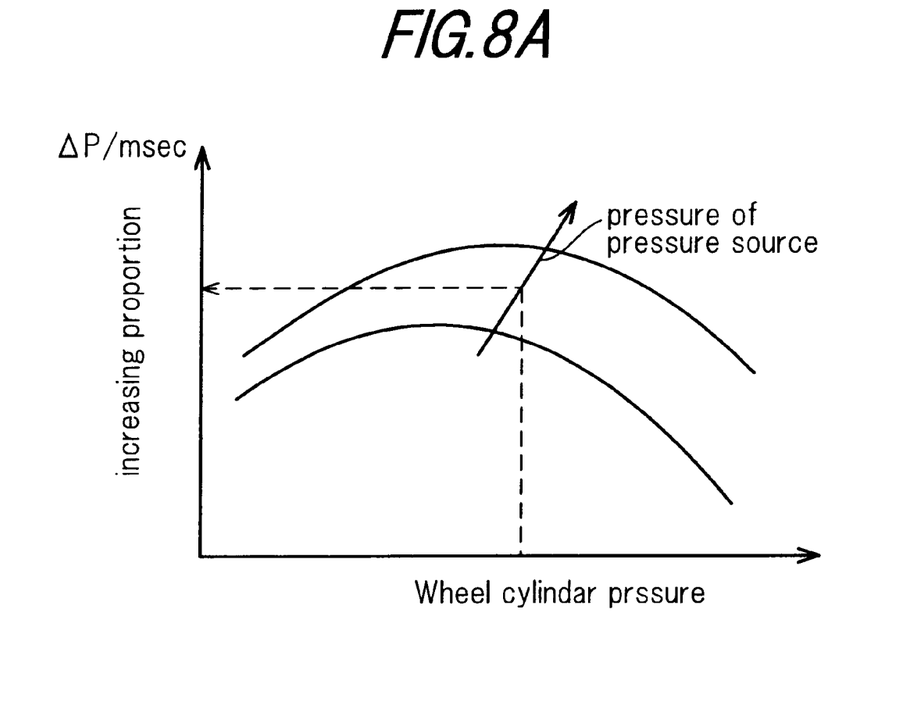
FIG. 8A shows the variation characteristic of pressure increase due to the pressure increasing valve.
Figure 8B:
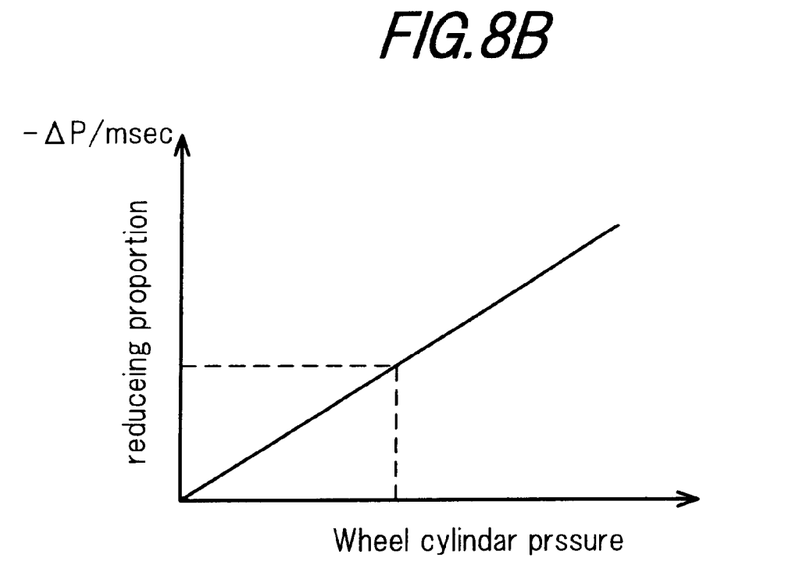
FIG. 8B shows the variation characteristic of pressure decrease due to the pressure reducing valve.

In performing this duty control, the pressure increase characteristics shown in FIG. 8(a) or the pressure decrease characteristics shown in FIG. 8(b) are used.

These characteristics are maps of the pressure increase/decrease proportion (±ΔP/msec) when the pressure increase valve or pressure decrease valve is kept open. The opening time of the pressure increase valve or pressure decrease valve, i.e. the drive duty of the pressure increase valve or pressure decrease valve, is determined and output based on these characteristics.

As a result, the pressure differential (P*) is reduced, and the intrinsic wheel cylinder pressure (PW) is made to coincide with the corresponding target value (P*).

In a step 93, the intrinsic wheel cylinder pressure (PW), which varies according to the aforementioned control, is computed and estimated from PW=PW±ΔP×ΔT, and this is used in the computation of the step 91 on the next occasion the control is performed.

In vehicle behavior control via the aforesaid wheel braking force control, the target braking force and its variation rate during behavior control are limited to an upper limit as described above. In other words, although they differ according to the condition of the road and running conditions, the target braking force and its variation rate are controlled to the largest permissible values within a range such that mutual interference between vehicle behavior control and antiskid control does not occur.

Therefore, hunting due to interference between the two types of control does not occur.

This eliminates the problem of a repeating cycle where the wheels lock during behavior control, the braking force is relaxed by slip control to unlock the wheels which causes the vehicle to behave undesirably, behavior control is applied again, the wheels lock again and slip control is performed again.

Also, in determining the aforesaid upper limits of the braking force target value and its variation rate, the upper limits are not unnecessarily restricted. The case where recovery of behavior is delayed by more than the response which is actually possible on a high friction road surface is therefore avoided.

In the aforesaid embodiment, the target slip ratio variation rate (ΔS*) was controlled to limit the braking force variation rate, but as, within a short time span, the target slip variation rate, is the same as the wheel rotation acceleration, the braking force variation rate may be limited to a value corresponding to this wheel rotation acceleration.

Moreover, in the aforesaid embodiment, the braking rigidity coefficient was set to specify the relation between the braking force and slip ratio, but as wheel load, road surface frictional coefficient and tire slip angle have typical characteristics, the same effect may be obtained by using these characteristics individually to establish a relation.

This invention is moreover not to be construed as being limited by the above embodiment, various modifications being possible within the scope and spirit of the appended claims.

What is claimed:

1. A vehicle control device, comprising:
   a vehicle behavior controller for controlling wheel braking force so that the behavior of the vehicle reaches a braking force target state, and
   a wheel slip controller for controlling wheel braking force so that a wheel slip ratio is a target slip ratio, wherein
   a braking force limit controller for controlling one of
      an upper limit of the wheel braking force for achieving a target vehicle behavior and
      an upper limit of the variation rate of the wheel braking force to a largest possible value at which there is no mutual interference between said vehicle behavior controller and said wheel slip controller.

2. A controller device comprising:
   a vehicle behavior controller for controlling a braking force of each wheel toward a braking force target value for each wheel so that the behavior of the vehicle reaches a braking force target state;
   a wheel slip controller for controlling said braking force of each wheel so that a wheel slip ratio is a target slip ratio of each wheel; and
   a braking force limit controller for:
      estimating a braking rigidity coefficient expressing a relation between said wheel slip ratio and braking force,
      calculating said target slip ratio by dividing said braking force target value before limiting by said braking rigidity coefficient, and
      limiting an upper limit of said braking force target value to the largest possible value at which there is no mutual interference between said vehicle behavior controller and said wheel slip controller, when a said target slip ratio exceeds a slip ratio set value.

3. A control device as defined in claim 2, wherein said braking force limit controller limits said braking force target value by limiting the maximum value of said target slip ratio.

4. A control device as defined in claim 2, wherein said braking force limit controller, when an absolute value of the wheel slip ratio exceeds a predetermined set value of the wheel slip ratio, computes said braking rigidity coefficient by dividing a wheel drive force calculated by subtracting a real braking force from an engine drive force, by the wheel slip ratio.

5. A control device as defined in claim 2, wherein said braking force limit controller, when an absolute value of the wheel slip ratio exceeds a predetermined set value of the wheel slip ratio, an an absolute value of a wheel drive force calculated by subtracting a real braking force from an engine drive force, exceeds a predetermined set value of the wheel drive force, computes said braking rigidity coefficient by dividing this wheel drive force by the wheel slip ratio.

6. A control device as defined in claim 2, wherein said braking force limit controller, when an absolute value of the wheel slip ratio is less than a predetermined set value of the wheel slip ratio, or when an absolute value of a wheel drive force calculated by subtracting a real braking force from an engine drive force, is less than a predetermined set value of the wheel drive force, calculates said braking rigidity coefficient based on a wheel load.

7. A control device as defined in claim 2, wherein said braking force limit controller corrects said braking rigidity coefficient calculated from a wheel load by either a road surface frictional coefficient or a wheel lateral slip angle, or both.

8. A control device comprising:
   a vehicle behavior controller for controlling a braking force of each wheel toward a braking force target value for each wheel so that the behavior of the vehicle reaches a braking force target state;
   a wheel slip controller for controlling said braking force of each wheel so that a wheel slip ratio is a target slip ratio of each wheel; and
   a braking force limit controller for
     estimating a braking rigidity coefficient expressing a relation between said wheel slip ratio and braking force,
     calculating said target slip ratio by dividing said braking force target value before limiting by said braking rigidity coefficient, and
     limiting an upper limit of said braking force target value to the largest possible value at which there is no mutual interference between said vehicle behavior controller and said wheel slip controller, when a variation rate of said target slip ratio exceeds a slip ratio variation set value.

9. A control device as defined in claim 8, wherein said braking force limit controller limits the variation rate of said braking force target value by limiting the maximum value of the variation rate of said target slip ratio.

10. A control device as defined in claim 8, wherein said braking force limit controller, when an absolute value of the wheel slip ratio exceeds a predetermined set value of the wheel slip ratio, computes said braking rigidity coefficient by dividing a wheel drive force calculated by subtracting a real braking force from an engine drive force, by the wheel slip ratio.

11. A control device as defined in claim 8, wherein said braking force limit controller, when an absolute value of the wheel slip ratio exceeds a predetermined set value of the wheel slip ratio, and an absolute value of a wheel drive force calculated by subtracting a real braking force from an engine drive force, exceeds a predetermined set value of the wheel drive force, computes said braking rigidity coefficient by dividing this wheel drive force by the wheel slip ratio.

12. A control device as defined in claim 8, wherein said braking force limit controller, when an absolute value of the wheel slip ratio is less than a predetermined set value of the wheel slip ratio, or when an absolute value of a wheel drive force calculated by subtracting a real braking force from an engine drive force, is less than a predetermined set value of the wheel drive force, calculates said braking rigidity coefficient based on a wheel load.

13. A control device as defined in claim 8, wherein said braking force limit controller corrects said braking rigidity coefficient calculated from a wheel load by either a road surface frictional coefficient or a wheel lateral slip angle, or both.

* * * * *